United States Patent Office 3,401,654
Patented Sept. 17, 1968

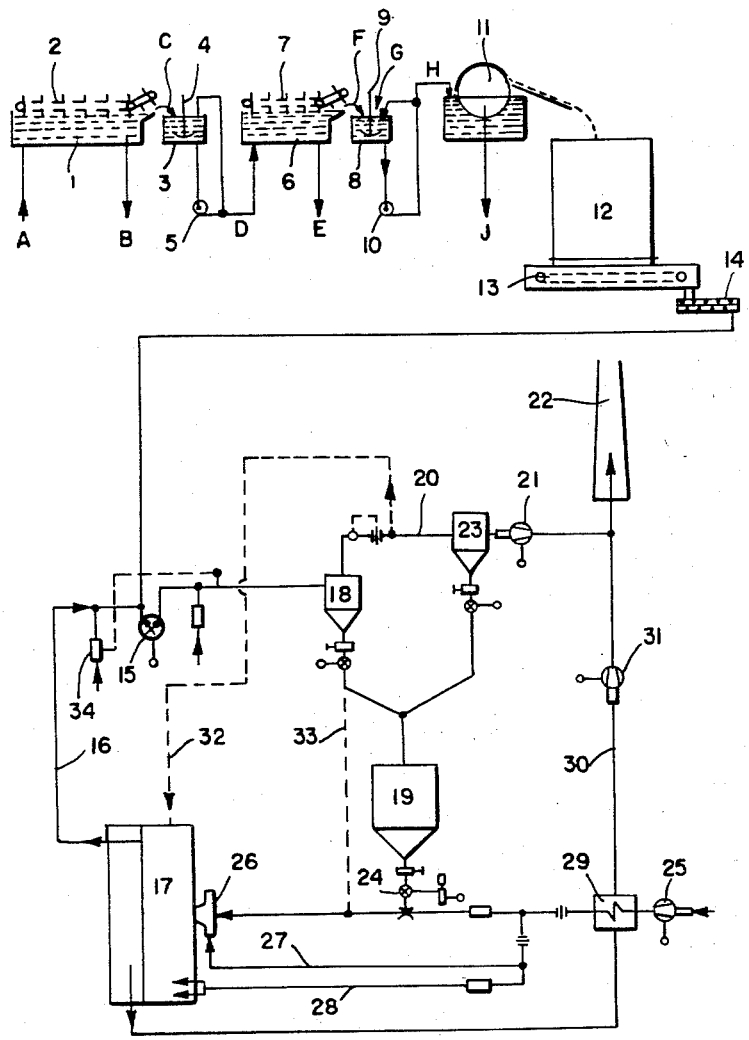

3,401,654
PROCESSING AQUEOUS SOOT SUSPENSIONS
Martin Reichert, Frankenthal, Pfalz, Ulrich Wagner, Limburgerhof, Pfalz, Werner Heitmueller, Bielefeld, and Guenter Huebner, Moerfelden, Germany, assignors to Badische Anilin- & Soda-Fabrik Aktiengesellschaft, Ludwigshafen (Rhine), Germany
Filed May 12, 1967, Ser. No. 638,094
Claims priority, application Germany, May 14, 1966, D 50,120
4 Claims. (Cl. 110—7)

ABSTRACT OF THE DISCLOSURE

A method of processing carbon black (soot) suspensions obtained in the manufacture of petrochemical raw materials, such as acetylene, ethylene and the like, from natural gas or petroleum or fractions of the same by partial combustion of these starting materials followed by quenching of the reaction gas formed with water. The suspensions of soot in water are creamed and separated from the bulk of the water, the separated sludge is homogenized by stirring and again creamed, and the concentrate thus obtained is withdrawn and filtered and then dried and ground to fine-grained soot which is burnt after removal of the vapor.

---

This invention relates to a method of processing soot suspensions.

In the production of petrochemical raw materials such as acetylene, ethylene, synthesis gas or town gas from natural gas or petroleum or certain fractions of the same, soot is formed as a byproduct when the heat requirement of the reaction in the said production is covered by partial oxidation of the starting material with oxygen. The amount of soot formed varies widely because it is dependent on the raw material and on the method used. In general it is from 2 to 7 g. per 100 g. of raw material. It is a common feature of all these methods that the soot is initially contained in the hot reaction gas. It is often scrubbed from the hot reaction gas with a liquid. The reaction gas is thus cooled in the desired way.

The present invention is concerned with the use of water for cooling and scrubbing so that the soot is in the form of an aqueous suspension after the scrubbing. The concentration of the suspension depends on the amount of soot formed, on the amount of water used for scrubbing and on whether the water is used once or more than once for scrubbing out soot. From 0.1 to 10 kg. of soot may be contained in 1 cubic meter of water. The soot has a higher specific gravity than water. The size of the soot particles is less than 1 micron and depends on the reaction conditions. Photographs taken with an electron microscope show that at 800° C. soot particles having a size of about 0.1 micron are formed while particles obtained at 1400° C. are 0.01 micron in size.

The size of the "primary particles" is not however of importance for separating the water, because the particles form agglomerates which may have a size of up to 100 microns. These soot flakes have very small gas bubbles adhering to them from their formation and these greatly decrease their specific gravity.

Processing these suspensions (which to avoid pollution cannot be discharged direct into rivers, lakes or the sea) constitutes a difficult problem. The soot can only be separated from the liquid with great difficulty so that owing to the slow rate of separation and the very large quantities involved, excessively large settling tanks would be necessary. This type of processing is therefore out of the question. Direct filtration of the suspensions obtained is also very difficult to carry out.

The present invention has for its object the provision of a simple method of processing soot suspensions obtained in the abovementioned petrochemical processes into dry carbon black that can be burnt, the said method being generally applicable where the specific gravity of the soot flakes is less than that of water because of the gas adhering thereto so that it rises in the water (creams).

The said object is achieved in accordance with this invention by a process by which the creamed soot having a foamy consistency is separated by a conventional method from the bulk of the water, then the separated foamy soot is stirred and allowed to cream again, the concentrate thus obtained is withdrawn and filtered, and the filter cake is dried by means of hot gas and ground into finely particled soot which, after withdrawal of adherent vapor is supplied for combustion as a combustible dry material.

It is advantageous to use for carrying out the drying of the soot, hot gas from a boiler firing plant which is drawn off from the fire box at an appropriate point.

The invention will now be described in greater detail with reference to the accompanying drawing which illustrates concentrating the soot suspension until a filter cake is obtained and the further processing of this filter cake.

The soot suspension A is first passed through an open channel 1 and the creamed soot concentrate, which has a foamy consistency, is removed with scrapers 2, the residence time of the suspension in the channel being dependent on the rate of supply and being such that adequate clarification of the water B is achieved, the water, after the concentrate (hereinafter called "foam") has been separated, being used again for washing out soot from reaction gas. This water normally contains 20 to 40 g. of soot per cubic meter.

The foam C is collected in a vessel 3. The soot content of this foam is up to 4 to 5% by weight with proper adjustment of the scrapers. It is not possible to achieve a higher concentration than this owing to the structure of the foam. Apparently the soot flakes form a framework which encloses twenty to twenty-five times their weight of water.

Surprisingly a further increase in the soot concentration may however be achieved by stirring the foam, so that it liquifies, and allowing it to cream again. Stirring of the foam may be effected by drawing it off into a stirred vessel designed according to the amount in question. The mean residence time of the foam in the vessel is from about five to thirty minutes. It is advantageous however to adopt the procedure illustrated in the drawing. The foam is first stirred for only a short time in the vessel 3. The foam during this short stirring treatment assumes a pumpable consistency and is supplied to a circulating pump 5 where it is stirred in consequence of the shear forces acting thereon. Some of the foam, for example at least twenty times the amount supplied to the stirred vessel 3, is pumped back into the stirred vessel after it has left the circulating pump and the remainder of the liquefied foam is supplied to another channel 6.

It has been found that liquefied foam treated in this way creams again, the creaming rate having been found to be between 0.2 and 1.0 mm per second. This rate is much below the creaming rate of the soot suspension A but this does not result in any difficulty because the amount of foam C to be processed is much less than the amount of soot suspension A. The channel 6 is entirely identical in construction to the channel 1 except that it may differ in size. This may be calculated from the amount of the supply C and the creaming rate. In general the second channel can be smaller than the first.

The clarified water E withdrawn from the channel 6 in general contains less than 40 g. of soot per cubic meter and may be returned to the process for the production of the petrochemical raw material. The enriched soot concentrate F is moved into container 8 by means of scrapers 7. Concentrations of 8 to 9% by weight are obtained in this way. The container 8 is provided with blade stirrer 9 and sludge pump 10, for example a two-rotor gear pump. It is also possible to meter additives G, particularly flocculants, into the container 8. The effect of the flocculant is described below. The concentrate H is moved direct into the trough of a rotary vacuum filter 11 by the sludge pump 10.

By means of the rotary vacuum filter 11 (which is equipped with a pressure band unit and scrapers for removing the filter cake), the concentrate is separated into a clear filtrate J having a maximum of 50 g. of soot per cubic meter of water and a filter cake K having 72 to 78% by weight of water. The capacity of the filter 11 (as may be seen from the table) is about twice as high as when using soot sludge D produced by a single creaming, when the above method is adopted. The results which are obtained by a single creaming are shown in the table below in the first vertical column 1, while the results obtained after a second creaming in accordance with this invention are shown in the second vertical column 2. As may also be seen from the table (see columns 3 and 4) a further increase in efficiency can be achieved by adding to the enriched soot concentrate F flocculants in an amount of 10 to 1000 p.p.m. by weight, although the creaming rate is not appreciably affected. Flocculating agents are generally polymers having a molecular weight of for example 50,000 to 80,000. Examples are starch products, such as polysaccharides, polyacrylates, such as the product known under the trade name Polyfloc, polyethylene oxides, such as the product known under the trade name Polyox, and proteins.

Filtration may also be influenced by the temperature of the concentrate H supplied. At temperatures below 50° C., the filtering efficiency falls off sharply and the water content of the filter cake rises to more than 79% by weight so that further processing in a combined grinding and drying unit is rendered impossible because such a material is no longer compact and the conveyor and mill entrance become clogged. For practical reasons, the temperature of the concentrate supplied to the filter should not exceed 90° C.

The filter cake is supplied to a mill 15 through a bunker 12 by a feed scraper 13 and a double screw 14. Drying of the cake and its comminution into fine-grained soot takes place in the mill. Hot gases, whose temperature is for example 750° to 850° C., from the process itself may in general be used for drying; it has been found to be convenient however to use for the purpose hot gas from the boiler firing plant in which the soot is burnt; this may be sucked through the gas channel 16 from the steam generator 17 by the mill 15.

From the mill, the vapor and the comminuted soot pass first into a cyclone separator 18 from which the soot is drawn off into a bunker 19 while the vapor passes through vapor line 20 and is supplied by means of vapor blower 21 into the stack 22. It is advantageous to provide a fabric filter 23 in the vapor line 20, in addition to the cyclone separator 18, for complete separation of the soot.

Soot deposited in the fabric filter 23 is combined with the soot from the cyclone separator 18 in the bunker 19 whence the appropriate amount of soot ready for burning is moved into the burner 26 of the steam generator 17 by means of a distributor 24 in correlation with the fresh air blower 25. Pipes for secondary air 27 and tertiary air 28 are provided in the firing unit in the conventional manner. The fresh air is heated up in an air preheater 29 which is located in the gas line 30 in front of the suction line 31.

A line 32, between the cyclone separator 18 and the fabric filter 23, passes from the vapor line 20 direct to the boiler firing plant in to which vapor is supplied to the tertiary air jets. In this way an appropriate variant is provided for the fire of the steam generator 17.

Another variant consists in providing a line 33 for direct injection of comminuted soot ready for burning while bypassing the bunker 19. This provides for the case where the soot is to be supplied direct to the fire without intermediate bunkering. The temperature of the mill 15 is regulated by a control member 34, cold air being introduced into the gas channel 16 behind the mill in dependence on the temperature.

The process according to the invention ensures a satisfactory destruction of soot occurring in various processes as a very dilute suspension in water, while utilizing its calorific value, the soot being first converted into compact material and dried and burnt as such.

In the following table, the rotary vacuum filter had the following data:

Surface: 0.75 square meter. Covering: multifilament cloth of polyester fibers.
Speed: 42 r.p.m. Vacuum: 0.2 to 0.4 atm. abs.

TABLE

|  | 1 | 2 | 3 | 4 |
|---|---|---|---|---|
| Amount of supply (cu. m./hour) | 560 | 694 | 900 | 920 |
| Temperature, ° C | 55 | 55 | 58 | 58 |
| Concentration (percent by weight of soot) | 5.0 | 9.0 | 8.8 | 8.8 |
| Additive (p.p.m.) | | | [1] 200 | [2] 200 |
| Soot cake: | | | | |
| Amount (cu. m./hour) | 110 | 250 | 316 | 325 |
| Concentration (percent by weight of soot) | 25.5 | 24.8 | 25.0 | 24.8 |
| Filtering efficiency (cu. m./sq.m.h.) | 146 | 334 | 422 | 433 |

[1] Polyfloc.
[2] Polyox.

We claim:

1. A method of processing very dilute aqueous suspensions of soot floating therein which comprises separating the bulk of the water from the creamed soot having the consistency of foam, stirring the soot thus separated and then creaming it again, drawing off the soot concentrate thus formed and filtering it, drying the filter cake by means of hot gas and grinding it to fine-grained soot, removing adherent vapor and burning the resultant combustible dry material.

2. A process as claimed in claim 1 wherein a flocculant is added to the concentrate to be filtered.

3. A process as claimed in claim 1 wherein the filtration is carried out at temperatures from 50° C. to 90° C.

4. A process as claimed in claim 1 wherein the filter cake is dried by means of hot gas from the combustion of soot.

References Cited

UNITED STATES PATENTS 2,246,151 4/1944 Burk.
2,685,369 8/1954 Crossley.
3,073,652 1/1963 Reichl.
3,351,030 11/1967 Albertson et al. _____ 110—7

JAMES W. WESTHAVER, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,401,654                                     September 17, 1968

Martin Reichert et al.

It is certified that error appears in the above identified patent and that said Letters Patent are hereby corrected as shown below:

Column 4, line 61, "2,246,151" should read -- 2,346,151 --.

Signed and sealed this 21st day of April 1970.

(SEAL)
Attest:

Edward M. Fletcher, Jr.                        WILLIAM E. SCHUYLER, JR.

Attesting Officer                                       Commissioner of Patents